United States Patent
Greger et al.

(10) Patent No.: US 9,757,901 B2
(45) Date of Patent: Sep. 12, 2017

(54) LASER SINTERING POWDER, LASER SINTERING ARTICLE, AND A METHOD OF MAKING A LASER SINTERING ARTICLE

(71) Applicant: Kraton Polymers U.S. LLC, Houston, TX (US)

(72) Inventors: Marcus Greger, Amsterdam (NL); Freddy Vervoort, Meldert (BE)

(73) Assignee: Kraton Polymers U.S. LLC, Houston, TX (US)

( * ) Notice: Subject to any disclaimer, the term of this patent is extended or adjusted under 35 U.S.C. 154(b) by 0 days.

(21) Appl. No.: 14/551,514

(22) Filed: Nov. 24, 2014

(65) Prior Publication Data

US 2015/0148467 A1    May 28, 2015

Related U.S. Application Data

(60) Provisional application No. 61/909,021, filed on Nov. 26, 2013.

(51) Int. Cl.
| | | |
|---|---|---|
| *C08L 53/02* | (2006.01) | |
| *B29C 67/00* | (2017.01) | |
| *B29K 9/06* | (2006.01) | |
| *B29K 96/04* | (2006.01) | |
| *B29K 105/00* | (2006.01) | |
| *B33Y 10/00* | (2015.01) | |
| *B33Y 70/00* | (2015.01) | |

(52) U.S. Cl.
CPC ........ B29C 67/0077 (2013.01); C08L 53/025 (2013.01); *B29K 2009/06* (2013.01); *B29K 2096/04* (2013.01); *B29K 2105/0032* (2013.01); *B29K 2105/0044* (2013.01); *B29K 2105/0085* (2013.01); *B29K 2105/251* (2013.01); *B33Y 10/00* (2014.12); *B33Y 70/00* (2014.12); *C08L 2205/02* (2013.01); *C08L 2205/03* (2013.01)

(58) Field of Classification Search
CPC ......... C08J 3/12; C08L 53/02; B29C 67/0077

USPC .......................................... 264/497; 524/151
See application file for complete search history.

(56) References Cited

U.S. PATENT DOCUMENTS

| | | | |
|---|---|---|---|
| RE27,145 E | 6/1971 | Jones | |
| 6,239,218 B1 * | 5/2001 | Yonezawa et al. | 525/98 |
| 7,390,856 B2 | 6/2008 | Johnson et al. | |
| 7,439,301 B2 | 10/2008 | Handlin, Jr. | |
| 2007/0197692 A1 * | 8/2007 | Monsheimer | B29C 67/0077 524/80 |
| 2009/0220917 A1 * | 9/2009 | Jensen | A61C 13/081 433/202.1 |
| 2011/0034590 A1 * | 2/2011 | Kuhn et al. | 523/351 |
| 2011/0129682 A1 * | 6/2011 | Kurata et al. | 428/500 |
| 2011/0184082 A1 * | 7/2011 | Wright et al. | 521/148 |
| 2012/0015202 A1 * | 1/2012 | Kenens | C08L 23/10 428/516 |
| 2012/0070665 A1 | 3/2012 | Bellomo et al. | |
| 2013/0225020 A1 | 8/2013 | Flood et al. | |

OTHER PUBLICATIONS

International Search Report for PCT/US2014/067062, dated Mar. 4, 2015.

* cited by examiner

*Primary Examiner* — Deve E Valdez
(74) *Attorney, Agent, or Firm* — Ekatherina Serysheva

(57) ABSTRACT

The present invention comprises a laser sintering powder composition comprising: greater than 30 to 90 wt. % of a hydrogenated styrene-butadiene/styrene-styrene (S(EB/S)S) block copolymer or a hydrogenated styrene-butadiene-styrene (SEBS) block copolymer, or a mixture thereof; 10 to less than 70 wt. % of a $C_3$ to $C_8$ polyolefin, or a mixture of two or more polyolefins, 0 to 20 wt. % mineral oil, 0.2 to 1 wt. % of one or more antioxidants, 0 to 5 wt. % colorant, 0 to 20 wt. % surface modifying agent, wherein the total of the above ingredients is 100 wt. %, and optionally 0 to 5 parts by weight of a powder flow agent, based on 100 weight parts of the laser sintering powder composition. The composition has a melt flow rate of at least 20 grams/10 min. at 190° C./2.16 kg mass. The invention also comprises laser sintered articles and methods for making the same.

11 Claims, No Drawings

LASER SINTERING POWDER, LASER SINTERING ARTICLE, AND A METHOD OF MAKING A LASER SINTERING ARTICLE

BACKGROUND OF THE INVENTION

Technical Field

The present invention relates to a laser sintering powder useful as a raw material powder in selective laser sintering and a shaped article obtained using the same, and more specifically relates to a laser sintering powder which has low porosity and is excellent in strength and elongation. Lastly, the present invention relates to a method of making a sinterable article via selective laser sintering.

Although laser sintering is an emerging field, it has many features that make it attractive, such as forming parts or articles that do not require a mold, employing just as much raw material as the parts or article need, no further tooling requirements, and using just enough energy to form the part or article and no long heating and cooling steps.

Background Art

Techniques of design and/or plan of products or components with computer software such as CAD, CAM and CAE have become popular in various industrial fields for automobiles, airplanes, buildings, home appliances, toys and convenience goods. A method for producing a physical model which is materialized from a three-dimensional model designed with CAD is called rapid prototyping system, rapid manufacturing system or the like.

The rapid prototyping systems have a delivery aperture for the laser sintering powder of a maximum opening of 150 microns. Therefore the maximum particle size of the laser sintering powder is typically no larger than 150 microns to allow it to pass through the opening. Other systems may have larger delivery openings, but generally larger particle sizes mean less precise definition of the laser sintered article. The rapid prototyping systems include selective laser sintering in which a thin layer of resin powder is selectively irradiated with a laser beam in accordance with slice data obtained by converting CAD data or the like of a three-dimensional shaped article so as to allow the powder to selectively sinter and adhere to each other. Then, another thin layer of resin powder is formed on the first formed layer. This same operation is repeated so as to perform sequential layer buildup to obtain a shaped article.

In selective laser sintering, shaping is performed by heating a layer of a resin powder (sometimes referred to as Selective Mask Sintering), or a portion of a layer, which has been fed to a platform upon which an article is to be formed. The entire layer mass is heated to about the softening point of the resin powder, in order to shorten the time required for shaping, and then the thin layer mass is selectively irradiated using a laser beam thereby allowing each layer to fuse with the other.

A typical example of the resin powder currently used in laser sintering is polyamide resin. Polyamide resin is a semi-crystalline resin, and has a softening point corresponding to the melting point thereof. Since polyamide resin is high in laser beam absorption, it easily reaches its melting point or higher temperature by irradiation with a laser beam and fluidizes so as to fuse each layer with each other. However, shaped articles obtained by laser sintering are generally in a porous state, and thus require a sealing treatment by vacuum impregnation to acquire hermeticity. Such post-treatment sealing can involve impregnating water-soluble polyurethane in the shaped article. The porous nature of the sintered polyamide articles is understood to result from the relatively high water absorption of polyamide. Upon irradiation and heating the absorbed water vaporizes to create voids and pores.

A laser sintering powder composition which is easily fusible and does not require such a post-treatment (especially of impregnating water-soluble urethane) has been desired.

On the other hand, styrene resin such as ABS (acrylonitrile-butadiene-styrene) resin is low in water absorption (demonstrating low porosity), and not only excellent in mechanical strength such as impact resistance but also excellent in secondary processability such as in coating and plating, and further provides transparent shaped articles. Thus, it is attractive as a raw material fir laser sintering processes. However these resins are rigid and yield hard, rigid sintered articles. They are not suitable for the fabrication of soft and/or elastic articles.

Styrene resin is a non-crystalline, glassy resin and has a softening point corresponding to its glass transition temperature. When a non-crystalline, glassy resin powder is used as a raw material for laser sintering, it is required that the bed or platform temperature is maintained around its glass transition temperature. Then, a laser beam is employed to radiatively heat the material to its glass transition temperature (Tg) or higher in order to cause sintering and fusion of the layers. When the temperature of a non-crystalline, glassy resin powder is elevated slightly over the glass transition temperature by irradiation with a laser beam, the resin is still too high in melt viscosity to flow and the whole resin powder does not come to uniformly melt. Thus, the shaped articles tend to be porous and low in density because of the low flow characteristics. On the other hand, use of a high-output laser makes it possible to raise the temperature of non-crystalline, glassy resins much higher than the glass transition temperature. In this case, it is difficult to control heating and as a result powders outside the laser-scanning region may be sintered, causing what is known as sintering swell, and impair dimensional accuracy. In this way materials may deteriorate.

Block copolymers having high flow characteristics have been taught by Handlin in U.S. Pat. No. 7,439,301. Those polymers were elastomeric styrenic block copolymers having linear or radial structures and high vinyl contents.

U.S. Publ. 2013/022502.0 to Flood et al discloses many different end uses for high flow block copolymers, including slush molding, comprising a very high melt flow hydrogenated triblock copolymer of styrene-ethylene butadiene-styrene.

U.S. Publ. 2012/0070665 to Bellomo et al describes a thermofusible composition for slush molding applications having finely divided particles of small size that is made into a skin, such as a dash board, for an automobile. The composition employs a selectively hydrogenated, controlled distribution block copolymer of styrene(ethylene-butylene/styrene)styrene block copolymer (S(EB/S)S). These thermofusible compositions require slush- or roto-molding fabrication techniques which themselves utilize expensive equipment and experience high thermal energy utilization.

U.S. Publ. No. 2011/0129682 to Kurata et al entitled Laser-Sinterable Powder and Shaped Article Thereof utilizes minor amounts of rubber reinforced styrene resins in laser sintering compositions. In particular, rigid, selectively hydrogenated acrylonitrile-butadiene-styrene-type resins or random, tapered styrenic block copolymers were blended with semi-crystalline polyolefins to make laser sintering compounds, The resulting articles are expected to be rigid.

Thus, there remains a need to expand the utility of relatively low energy laser sintering processes. Further, as an alternative to compositions comprising rigid materials such as ABS and polyamide, it is desirable to make laser sintering compositions comprising soft, elastic materials. in this way, soft or elastic articles can he made using low energy laser sintering processes.

SUMMARY OF THE INVENTION

According to the broadest scope, the present invention comprises a laser-sintering powder composition comprising: greater than 30 to 90 wt. %, preferably 35 to 80 wt. %, and more preferably 40 to 70 wt. % of a selectively hydrogenated controlled distribution styrene-ethylene-butylene/styrene-styrene (S(EB/S)S) block copolymer or a selectively hydrogenated styrene-(ethylene-butylene)-styrene (SEBS) block copolymer or a mixture thereof; 10 to less than 70 wt. %, preferably 20 to 65 wt. %, and more preferably 25 to 60 wt. % of a $C_3$-$C_8$ polyolefin, or a mixture of two or more $C_3$-$C_8$ polyolefins; 0 to 20 wt. %, preferably 1 to 15 wt. %, and more preferably 2 to 9 wt. % mineral oil; 0.2 to 1 wt. % of one or more antioxidants; 0 to 5 wt. % colorant; 0 to 10 wt. %, preferably 0.5 to 7 wt. %, and more preferably 1 to 5 wt. % surface modifying agent, wherein the total of the above ingredients is 100 wt. %, and optionally 0 to 5 wt. % and preferably 0.1 to 3 wt. %, and more preferably 0.2 to 1 wt. % of a sinterable powder flow agent, based on 100 parts by weight of the laser sintering powder composition. The laser sinterable powder composition must have a melt flow rate of at least 20 g/10 min at 190° C./2.16 kg mass according to ASTM D1238.

Another aspect of the present invention comprises a method of producing a laser sintered article comprising: positioning a thin layer or portion of a laser sintering powder composition on a base support; wherein said laser powder composition, before sintering, comprises greater than 30 to 90 wt. %, preferably 35 to 80 wt. %, and more preferably 40 to 70 wt. % of a selectively hydrogenated styrene-(ethylene-butylene/styrene)-styrene (S(EB/S)S) block copolymer or a selectively hydrogenated styrene-(ethylene-butylene)-styrene (SEBS) block copolymer, or a mixture thereof; 10 to less than 70 wt. %, preferably 2.0 to 65 wt. %, and more preferably 25 to 60 wt. % of $C_3$-$C_8$ polyolefin, or a mixture of two or more polyolefins; 0 to 20 wt. %, preferably 1 to 15 wt. %, and more preferably 2 to 9 wt. % mineral oil; 0.2 to 1 wt. % of one or more antioxidants; 0 to 5 wt. % colorant; 0 to 10 wt. %, preferably 0.5 to 7 wt. %, and more preferably 1 to 5 wt. % surface modifying agent, wherein the total of the above ingredients is 100 wt. %, and optionally 0 to 5 wt. % and preferably 0.1 to 3 wt. %, and more (preferably 0.2 to 1 wt. % of a sinterable powder flow agent, based on 100 weight parts of the laser sintering powder composition, said laser sintering powder composition must have a melt flow rate of at least 20 g/10 min. at 190° C./2.16 kg mass according to ASTM D1238; irradiating said thin layer or portion of laser sintering powder composition with a laser beam to selectively sinter the powder by sintering the whole layer or sintering parts of said layer; and then repeating the steps of positioning another thin layer or another portion on said base or on top of sintered powder, followed by irradiating the another thin layer or another portion with said laser beam so as to selectively sinter the powder in said another thin layer or another portion, and continue such method until the desired object or article is complete.

A further aspect of the present invention is a shaped article which results from laser sintering powder composition comprising greater than 30 to 90 wt. %, preferably 35 to 80 wt. %, and more preferably 40 to 70 wt. % of a selectively hydrogenated styrene-(ethylene-butylene/styrene)-styrene (S(EB/S)S) block copolymer or a selectively hydrogenated styrene-(ethylene-butylene)-styrene (SEBS) block copolymer, or a mixture thereof; 110 to less than 70 wt. %, preferably 20 to 65 wt. %, and more preferably 25 to 60 wt. % of $C_3$-$C_8$ polyolefin, or a mixture of two or more polyolefins; 0 to 20 wt. %, preferably 1 to 15 wt. %, and more preferably 2 to 9 wt. % mineral oil; 02 to 1 wt. % of one or more antioxidants; 0 to 5 wt.% colorant; 0 to 10 wt. %, preferably 0.5 to 7 wt. %, and more preferably 1 to 5 wt. % surface modifying agent, wherein the total of the above ingredients is 100 wt. %, and optionally 0 to 5 wt. % and preferably 0.1 to 3 wt. %, and more preferably 0.2 to 1 wt. % of a sinterable powder flow agent, based on 100 weight parts of the laser sintering powder composition. This article has low water absorption as characterized by ISO 62:2011, a tensile strength of 0.5 to 7.5 MPa as measured by DIN ISO 527-3, type 5 dumbbell specimen, at a speed of 100 mm/min., and a density of at least 0.75 g/cm$^3$ as measured by X-ray computed tomography.

The present invention relates to a laser sintering powder composition useful as a raw material powder in selective laser sintering and a shaped article obtained using the same. More specifically articles formed from the laser sintering powder composition are dense and have low total porosity.

Lastly, the present invention relates to a method of making a sinterable article via selective laser sintering using the composition of the present invention.

DESCRIPTION OF THE PREFERRED EMBODIMENTS

The numerical ranges set forth in this application are inclusive of each end number of the range and includes all conceivable numbers between the end range numbers, since that is the very definition of a range. Thus a narrower range can be any value between and including either one of the end range numbers and an intermediate number, According to the present invention, a laser sintering powder composition is made, in part, from a selectively hydrogenated styrenic block copolymer or a mixture of such block copolymers and a polyolefin having a melting temperature sufficiently close to the softening temperature of the block copolymer. Thus, the laser sintering powder composition exhibits a sharp decrease of melt viscosity at a temperature above the highest glass transition temperature (Tg) of the block copolymer and has excellent laser sinterability. The shaped article obtained by laser sintering the powder has high impact resistance, excellent secondary processability, low water absorption and excellent dimensional accuracy, higher elongation (150 to 350% elongation at break), flexibility and is soft (30 to 95 Shore A). The selectively hydrogenated styrenic block copolymer component used in the present invention is a selectively hydrogenated monoalkenyl arene-conjugated diene-monoalkenyl arene (SEBS), or a selectively hydrogenated monoalkenyl arene-conjugated diene/monoalkenyl arene-monoalkenyl arene (S(EB/S)S) obtained by sequentially polymerizing a monomer component comprising monoalkenyl arene(s) and then polymerizing conjugated diene(s) monomer or copolymerizing conjugated diene and monoalkenyl arenes in a controlled distribution fashion, followed by polymerizing another monomer of monoalkenyl arene, or by coupling to form a radial polymer as explained below.

In any case, the SEBS and S(EB/S)S block copolymers are elastic or rubbery in character at normal use temperatures. This results from the separate physical nature of the monoalkenyl arene blocks and the blocks comprising conjugated diene. The monoalkenyl arene blocks are glassy at room temperature while the selectively hydrogenated blocks comprising conjugated dimes are well above their Tg and are themselves rubbery. Such block copolymers remain solid and will not flow, fuse or sinter (in the sense of the present invention) until they reach temperatures above their highest Tg. Their highest Tg is that of the glassy monoalkenyl arene blocks.

Suitable monoalkenyl arctic are styrene, α-methylstyrene, methylstyrenes other than α-methylstyrene, vinyl toluene, para-butylstyrene, ethylstyrene and vinylnapthalene, and these can be used alone or in combination of two or more. Preferred is styrene.

Suitable conjugated dienes are 1,3 butadiene, substituted butadiene such as isoprene, piperylene, 2,3 dimethyl-1,3 butadiene, myrcene, and 1 phenyl-1,3 butadiene or mixtures thereof. Preferred is 1,3 butadiene (herein referred to as butadiene).

The molecular structure of the above block copolymer may be sequential or branched, radial or a combination of these, and the block structure thereof may be triblock or multiblock or a combination of these. Later, if desired, the block copolymer is hydrogenated in a separate step. Such hydrogenation is taught in U.S. Pat Nos. RE 27,145 and 7,390,856.

Another aspect of the present invention is to control the microstructure or vinyl content of the conjugated diene. In the present invention the term "vinyl" means those conjugated dienes that are incorporated in the polymer chain via a 1,2-addition mechanism when 1,3-butadiene monomer is polymerized. The result is a monosubstituted olefin group pendant to the polymer backbone, a vinyl group. In the case of anionic polymerization of isoprene, insertion of the isoprene via a 3,4-addition mechanism affords a geminal dialkyl $C=C$ moiety pendant to the polymer backbone and this is referred to as a "vinyl group". The effects of 3,4-addition polymerization of isoprene on the final properties of the block copolymer will be similar to those from 1,2-addition of butadiene. Polymer microstructure (mode of addition of the conjugated diene) is effectively controlled by addition of an ether, such as diethyl ether, a diether such as 1,2-diethoxypropane, or an amine as a microstructure modifier to the diluent. Suitable ratios of microstructure modifier to lithium polymer chain end are disclosed and taught in US RE 27,145.

As used herein, the term "molecular weights" refers to the apparent molecular weight of the polymer or block of the copolymer. The molecular weights referred to in this specification and claims can be measured with gel permeation chromatography (GPC) using polystyrene calibration standards, such as is done according to ASTM D5296. GPC is a well-known method wherein polymers are separated according to molecular size, the largest molecule eluting first. The chromatograph is calibrated using commercially available polystyrene molecular weight standards. The molecular weight of copolymers measured using GPC so calibrated are styrene equivalent molecular weights and are referred to as apparent molecular weights. The apparent molecular weights differ from the absolute or true molecular weight when the composition of the polymer eluting through the GPC columns is different in composition from polystyrene. However, comparison to well characterized model polymers allows conversion from apparent molecular weight to true or absolute molecular weight when necessary. The detection method used is preferably a combination of ultraviolet and refractive index detectors. The molecular weights expressed herein are measured at the peak of the GPC trace, and are commonly referred to as peak apparent molecular weights.

The SEBS polymers of the present invention have been generally described in U.S. Pat. No. 7,439,301 and are block copolymers having the general formula S-EB-S or $(S-EB)_n X$ where S is a monoalkenyl arene block, EB is a selectively hydrogenated conjugated diene block, n ranges from 1.5 to 6.0, and X is the residue of a multifunctional coupling agent. The S-EB-S formula represents a linear triblock structure and the $(S-EB)_n X$ formula represents a radial block copolymer structure. The preferred structure is the radial structure where n ranges from 2.0 to 4.0.

The statistical coupling practiced in the present invention leads to a distribution of arm numbers (n). It will be understood by the skilled person that the expressed generic values of n represent the average of such a distribution which is made of a collection of species having n=1, 2, 3, etc. In practice, some proportion of the living arms remain uncoupled (n=1 or unreacted with coupling agent). The coupling efficiency of such a radial polymer is defined as the percentage of living arms incorporated into species having n=2 or greater.

In a preferred embodiment the radial SEBS block copolymer is comprised primarily of the linear species (n=2) and the coupling efficiency is greater than 80%. Most preferred are radial SEBS block copolymers having a coupling efficiency of 90% or greater in which the distribution of coupled species is comprised of 50% or more of the linear (n=2) species.

The peak apparent molecular weight of the SEBS ranges from 50,000 to 150,000. More preferred are molecular weights from 55,000 to 120,000 and most preferred are molecular weights from 60,000 to 90,000.

The polystyrene content (PSC) of the SEBS ranges from 10 to 30 wt. % basis the total weight of the block copolymer. More preferred is a PSC from 12 to 28 wt. % and most preferred is 15 to 25 wt. %. Herein PSC refers to the monoalkenyl arene content regardless of whether the monoalkenyl arene is styrene or another monoalkenyl arene suitable for the invention.

The vinyl content of the SEBS ranges from 60 to 80%. More preferred is a vinyl content from 65 to 80% and most preferred is 70 to 80%.

The resulting SEBS copolymers are characterized by high melt flow having a melt flow index of at least 100 g/10 min. and are typically in the range of 100 to 350 g/10 min. as measured by ASTM D1238 at 230° C./2.16 kg. The more preferred SEBS block copolymers have a melt flow index in the range of 150 to 325 g/10 min. and most preferred SEBS block copolymers have a melt flow index in the range of 200 to 300 g/10 min.

The S(EB/S)S controlled distribution block copolymers of the present invention have the general formula S-(EB/S)-S or $(S-(EB/S))_n X$ where S is a monoalkenyl arene block, EB/S is a selectively hydrogenated, controlled distribution copolymer block of conjugated diene and monoalkenyl arene, n ranges from 1.5 to 6.0, and X is the residue of a multifunctional coupling agent. The S-(EB/S)-S formula represents a linear triblock structure and the $(S-(EB/S))_n X$ formula represents a radial block copolymer structure. The preferred structure is the radial structure where n ranges from 2.0 to 4.0. As in the case of the SEBS block copolymer, the radial form of the controlled distribution block copolymer is made by a statistical coupling process and a similar distribution of arm numbers (n) results.

In a preferred embodiment the radial S(EB/S)S block copolymer is comprised primarily of the linear species (n=2) and the coupling efficiency is greater than 80%. Most preferred are radial S(EB/S)S block copolymers having a coupling efficiency of 90% or greater in which the distribution of coupled species is comprised of 50% or more of the linear (n=2) species.

The peak apparent molecular weight of the S(EB/S)S ranges from 90,000 to 200,000. More preferred are molecular weights from 100,000 to 180,000 and most preferred are molecular weights from 110,000 to 140,000.

The total polystyrene content (PSC) of the S(EB/S)S ranges from 20 to 50 wt. % basis the total weight of the block copolymer. More preferred is a total PSC from 25 to 45 wt. % and most preferred is 30 to 40 wt. %. The (EB/S) block has a PSC from 5 to 40 wt. % basis the weight of the (EB/S) block, More preferred (EB/S) block PSC ranges from 10 to 35 wt. % and most preferred is 16 to 28 wt. %.

The vinyl content of the S(EB/S)S ranges from 60 to 85%. More preferred is a vinyl content from 65 to 80% and most preferred is 70 to 80%.

The resulting S(EB/S)S polymers have a melt flow index of at least 20 g/10 min. and are typically in the range of 20 to 60 g/10 min. as measured by ASTM D1238 at 230° C./2.16 kg. The more preferred S(EB/S)S block copolymers have a melt flow index in the range of 30 to 55 g/10 min. and most preferred S(EB/S)S block copolymers have a melt flow index in the range of 35 to 50 g/10 min.

The $C_3$-$C_8$ olefin polymer can be, but is not limited to, propylene, ethylene-α-olefin copolymer rubbers such as ethylene-propylene copolymers, ethylene-propylene-non-conjugated diene copolymers, ethylene-1-butene copolymers, and ethylene-1-butene-non-conjugated diene copolymers, ethylene-octene copolymer. These can be used alone or in combination of two or more. Olefins as the constituent monomer unit of the above polyolefin resin may also include, for example 1-butene, 1-pentene, 1-hexene, 3-methyl-1-butene, 4-methyl-1-pentene and 3-methyl-1-hexene, and preferably ethylene, propylene, 1-butene, 3-methyl-1-butene and 4-methyl-1-pentene. These can be used alone or in combination of two or more. In addition, another monomer including non-conjugated dienes such as 4-methyl-1,4-hexadiene, 5-methyl-1,4-hexadiene, 7-methyl-1,6-octadiene and 1,9-decadiene can be used as a part of the constituent monomer unit.

The melting point of the above polyolefin crystalline resin is less than 170° C., preferably 90 to 170° C., more preferably 110 to 160° C., and most preferably 135 to 60° C. as measured by DSC. When the melting point of the above crystalline resin is within the range of 90 to 170° C., density, strength and dimensional accuracy of the shaped article are favorably well-balanced. When the melting point is greater than 170° C. the temperature at which the block copolymers and polyolefins soften is too different to allow suitable sintering at a single laser temperature. The above polyolefin resin is typically a polymer comprising at least one olefin selected from the group consisting of ethylene and α-olefins with 3 to 8 carbon atoms as a constituent monomer unit. As the polyolefin resin, preferably used is one having a degree of crystallinity measured by X-ray diffraction at room temperature of not less than 20%, and preferably used is one having a melting point of not less than 40° C.

The above polyolefin resin may be a homopolymer or copolymer, and the copolymer may be any of a random copolymer or block copolymer, but is preferably a block copolymer because a shaped article with high density and high impact resistance can be obtained. As the above polyolefin resin, may be used ionomers, ethylene-vinyl acetate copolymers, ethylene-vinyl alcohol copolymers, cyclic olefin copolymers, chlorinated polyethylenes, brominated polyethylenes and modified polyolefin resins modified with a functional group. As the modified polyolefin resin, can be used a conventional one which is obtained by, for example, graft-copolymerizing a functional group-containing unsaturated compound with a polyolefin resin. The functional group-containing unsaturated compound used here is preferably one that improves compatibility with the hydrogenated styrenic block copolymer, and includes, for example, at least one selected from the group consisting of aromatic vinyl compounds, vinyl cyanide compounds, unsaturated carboxylic acids and unsaturated acid anhydrides. The modified polyolefin resin that is preferable in view of compatibility with hydrogenated styrenic block copolymer, for example, a polyolefin resin modified with maleic anhydride. Of the above polyolefin resins, polypropylene resins which are polymers mainly comprising propylene units such as polypropylene and propylene-ethylene copolymers are preferable, propylene-ethylene random copolymers and propylene-ethylene block copolymers are more preferable, and propylene-ethylene block copolymers are particularly preferable. These can be used alone or in combination of two or more.

The above polyolefin resin preferably has, for example, in case of a polypropylene resin, a melt flow rate (MFR) at a temperature of 190° C. under a load of 2.16 kg of 0.5 to 200 g/10 min. according to ASTM D1238. The amount of hydrogenated styrenic block copolymer of the present invention is greater than 30 to 90 wt. %, preferably 35 to 80 wt. %, and more (preferably 40 to 70 wt. % relative to 100 wt. % of the total weight of the laser sintering powder of the present invention. When the amount of hydrogenated block copolymer is 30 wt. % or less, density and impact resistance of the shaped article are lowered, and further dimensional accuracy thereof is inferior. On the other hand, when the amount to be used of hydrogenated styrenic block copolymer exceeds 90 wt. %, impact resistance (Charpy impact strength with notch) and water absorption resistance of the laser sintered article are inferior, and further warping occurs.

One or more surface modifying agents may be useful in the laser sintering powder compositions of the present invention. These may be present in an amount of 0 to 10 wt. %, preferably 0.5 to 7 wt. % and more preferably 1 to 5 wt. %, wherein the surface modifying agent, hydrogenated styrenic block copolymer, $C_3$-$C_8$ polyolefins, mineral oil, fillers, antioxidants, and colorant total 100 wt. % of the laser sintering powder composition.

Surface modifying agents may be incorporated to enhance the appearance of performance of the laser sinterable powder compositions. For instance, polysiloxanes such as those marketed under the Tegomer 6264 name by Evonik Degussa will reduce the coefficient of friction of the composition and may improve the sintered article haptic properties.

Fillers may optionally be incorporated into the laser sintering powder composition. Suitable fillers include, for example, talc, mica, clay, wollastonite, calcium carbonate, glass fiber, glass bead, glass balloon, milled fiber, glass flake, carbon fiber, carbon flake, carbon bead, carbon milled fiber, metal flake, metal fiber, metal coated-glass fiber, metal coated-carbon fiber, metal coated-glass flake, silica, ceramic particle, ceramic fiber, aramid particle, aramid fiber, polyacrylate fiber, graphite, conductive-carbon black, and various whiskers. These can be used alone or in combination of two or more. Generally, the amount of filler can be as high as 30 wt. %. However, for the present invention where the possibility to make soft, flexible articles is reserved the amount is usually 0 to 5 wt. %, preferably 0 to 2 wt. %, and more preferably 0 to 1 wt. % of the laser sintering powder composition.

Also, blended into the compositions of the present inventions are various optional antioxidants. One or more antioxidants are generally desired components in the present invention, but are not mandatory. Most antioxidants fall into the category of primary or secondary antioxidants and have different functions due to different chemical structures. A primary antioxidant is typically a hindered phenol or arylamines. Primary antioxidants scavenge alkoxy radicals and peroxy radicals. Many primary antioxidants that are compatible with styrenic block copolymers may be incorporated into the compositions of the present invention. Primary antioxidants sold under the trade name Irganox from BASF may be suitable, such as 1010, 1076, and 1330.

Secondary antioxidants may also be used along with the primary antioxidants. Secondary antioxidants are typically phosphites and thiosynergists. Secondary antioxidants scavenge hydroperoxides which are generated during the autoxidation cycle of a polymer exposed to heat and oxygen. Various compositions sold under the trade name Irgafos, may be suitable and are likewise manufactured by BASF. Irgafos 168 and the like may be suitable for the present invention.

Other optional additives such as UV absorbers or suitable coloring agents, colorants, dyes or pigments may also be employed. These included, for example, inorganic pigment, organic pigment, and dye. These can be used in combination of two or more. The content of the above coloring material is usually not more than 5 wt. %, preferably 0.001-5 wt. % of the laser sintering powder composition.

The powder flow agent in the present composition is applied to the surface of the laser sintering powder composition and is an inorganic powdered substance typically having a particle size of less than 10 microns selected from the group consisting of hydrated silicas, amorphous alumina, glassy silicas, glassy phosphates, glassy borates, glassy oxides, titania, talc, mica, fumed silicas, kaolin, attapulgite, calcium silicates, alumina and magnesium silicates, siloxanes, metal oxides, ceramic oxides, or a mixture thereof. The flow agent is present only in an amount sufficient to cause the resin powder to flow and level.

Powder flow agents prevent aggregation of the composition particles thereby maintaining the laser sintering powder composition particle size. Small amounts of powder flow agents should have no detectable influence on the thermoanalytical behavior of the compositions as would be evidenced by DSC. Suitable powder flow agents are laser sinterable, such as hydrophobic fumed silica, fumed metal oxides, etc. These are known commercially under the trade names Aerosil R812 or R972, and AluC, respectively, and are available from Evonik Degussa. The amount of powder flow agent employed is 0 to 5 parts by weight based on 100 weight parts of the laser sintering powder composition, preferable 0.1 to 3 parts by weight, and more preferably 0.2 to 2.0 parts by weight based on 100 parts by weight of the laser sintering powder composition. The preferred powder flow agents are hydrophobic fumed silica and fumed metal oxide. These preferred powder flow agents minimized the static charge build up on the laser sintering powder composition during handling and processing. Preferably, the powder flow agent is applied to treat the surface of the laser sintering powder composition using a low shear mixer such as a V-blender or a plough shear mixer. These conditions apply the powder flow powder to the laser sinterable powder composition to evenly distribute the powder flow agent over the particles of the laser sinterable powder composition surface.

The laser sintering powder composition of the present invention, with or without the optional additives, is required to be a powder having an average particle diameter of 1 to 250 μm, preferably having an average particle diameter of 5 to 180 μm, more preferably 5 to 120 μm, and most preferably 10 to 80 μm. These last two ranges for average particle diameter are suitable for the Rapid prototyping systems. The first two ranges of particle size may be useful in other systems. When the average particle diameter is less than 1 μm, fluidity of the laser sintering powder composition is insufficient. When the average particle diameter exceeds 250 μm, dimensional accuracy of the shaped article may be insufficient and large unevenness may occur on a surface of the shaped article.

The laser sintering powder composition is excellent in tensile strength as measured by DIN ISO 527-3 on dumbbell specimen type 5, at a speed of 100 mm/minute. They have excellent elongation at break and tensile stress at their yield point. Further the laser sintering powder composition provides shaped articles low in water absorption. The laser sintering powder composition is hydrophobic due to the chemical nature of the polymers employed. In this invention, low water absorption means a water content of 500 ppm or less in the block copolymer.

The melt flow rate of the laser sintering powder compositions are ≥20 g/10 min., preferably larger than about 25 g/10 min.

In the laser sintered articles the density or porosity can be measured by X-ray computed tomography. The volume of holes relative to the total volume of the part is computationally determined. The porosity of the articles of the present invention is not more than 15%, preferably not more than 10%, more preferably not more than 5%, and most preferably not more than 1%.

EXAMPLES

Polymer 1 was a selectively hydrogenated controlled distribution block copolymer comprising styrene (S) blocks and selectively hydrogenated copolymer blocks of butadiene and styrene (EB/S) having the structure (S-(EB/S))$_n$X in which the polymer was primarily the linear species (the n=2. species made up at least 50 wt. % of the coupled species distribution). The coupling efficiency was 95%. The overall polystyrene content was 35 wt. % with the (EB/S) block itself being composed of 22 wt. % styrene. The vinyl content was 69 mol % based on the total butadiene content in the (EB/S) block. The total peak apparent molecular weight was 138,000 and the melt flow was 45 g /10 min. (230° C./2.16 kg).

Polymer 2 was a selectively hydrogenated block copolymer comprising styrene (S) blocks and selectively hydrogenated butadiene (EB) blocks having a structure (S-EB)$_n$X in which the polymer was primarily the linear species (the n=2 species made up at least 50 wt. % of the coupled species distribution). The coupling efficiency was 95%. The polystyrene content was 20 wt. % based on the total weight of the block copolymer. The vinyl content was 75 mol %. The total apparent molecular weight was 77,400 and the melt flow was 230 g/10 min. (230° C./2.16 kg).

Moplen HP500V was a polypropylene powder obtained from LyondellBasell having a melting point of 163° C. and a melt flow rate of 120 g/10 min, (230° C./2.16 kg).

Plasblak 4623 was a carbon black masterbatch obtained from Cabot.

Primol 352 was a saturated hydrocarbon oil obtained from ExxonMobil.

Irganox 1010, Irganox1330, and Irgafos 168 were antioxidants obtained from BASF.

PB 800M was a homopolybutylene having a melt flow rate of 200 g/10 min. (190° C./2.16 kg) obtained from LyondellBasell.

Metocene MF650 W was a high melt flow homopolypropylene obtained from LyondellBasell.

Drakeol 34 was a white mineral oil from Calumet Penreco.

Tegomer 6264 was a polysiloxane additive obtained from Evonik Degussa.

Tinuvin 326 was a UV light stabilizer obtained from BASF.

H1-100 was a black colorant obtained from Cabot.

The following compositions set forth in Table 1 to 3 were made by melt mixing the ingredients together into a homogeneously uniform composition followed by cryogrinding into powder after which the powder flow agent was applied. The components of the laser sinterable powder composition are listed in weight percent in Tables 1 to 3.

TABLE 1

| Compound #745 | 1 | 2 | 3 |
|---|---|---|---|
| Polymer 1 | 68.0% | 34.0% | |
| Polymer 2 | | 34.0% | 68.0% |
| Moplen HP500V | 29.5% | 29.5% | 29.5% |
| Plasblak 4623 | 2.0% | 2.0% | 2.0% |
| Irganox 1010 | 0.2% | 0.2% | 0.2% |
| Irgafos 168 | 0.3% | 0.3% | 0.3% |
| Total wt. % | 100% | 100% | 100% |

TABLE 2

| Compound #745 | 4 | 5 |
|---|---|---|
| Polymer 1 | 50.1% | 42.6% |
| PB800M | 19.1 | 9.0 |
| Moplen HP500V | 25.0 | 42.6 |
| Primol | 3.0 | 3.0 |
| Plasblack 4623 | 2.3 | 2.3 |
| Irganox 1010 | 0.2 | 0.2 |
| Irgafos 168 | 0.3 | 0.3 |

TABLE 3

| Compound #745 - 6 | % |
|---|---|
| Polymer 2 | 55.71 |
| PB800 | 12.38 |
| Metocene MF650W | 15.36 |
| Drake oil 34 | 8.64 |
| Tegomer 6264 | 4.88 |
| Irganox 1330 | 0.15 |
| Irgafos 168 | 0.19 |
| Tinuvin 326 | 0.29 |
| H1-100 | 2.4 |

Composition 1 failed. The melt flow rate was too low. Composition 2 was not tested due to its low melt flow rate. Compositions 3 to 6 were laser sinterable. The laser sintering powder compositions were dusted with 0.2 to 0.5 parts by weight, based on 100 parts by weight of the laser sintering powder composition, of powder flow agent AluC or Aerosil R972.

Compositions 1 to 6 were tested for melt flow rate, hardness and particle size distribution and reported in Table 4 below. Melt flow rate measurements were conducted at 190° C./2.16 kg per ASTM D1238 and are reported in g/10 min.

In Table 4, Shore A hardness is determined on injection molded plates made from laser sintering powder composition, not on the laser sintered article. Shore A hardness is conducted in accordance with ASTM D2240. The particle size distribution of the cryoground composition was measured and is reported in Table 4. Particle size distribution D50 is also known as the median diameter or the medium value of the particle size distribution, it is the value of the particle diameter at 50% in the cumulative distribution. Particle size distribution D97 is the particle diameter value where 97% of the sample is smaller than that value. It is useful for determining the upper limit to the particle size distribution.

TABLE 4

| | Melt Flow | Shore A | D97 | D50 |
|---|---|---|---|---|
| 745-1 | 10 | 81 | 156 | 101 |
| 745-2 | 19 | 84 | 148 | 91 |
| 745-3 | 27 | 83 | 141 | 78 |
| 745-4 | 33 | 90 | 153 | 95 |
| 745-5 | 26 | 95 | 150 | 86 |
| 745-6 | 141 | 72 | 147 | 88 |

Further, these laser sintering compositions were employed in a laser sintering device and produced two different devices, demonstrating that articles can be made that have a softer structure compared to ABS produced articles. To be clear, laser sintering compounds based on ABS or polyamide are too hard to be measured on the Shore A scale.

Thus it is apparent that there has been provided, in accordance with the invention, a laser sintering powder uniform composition incorporating a SEBS resin and a polyolefin that fully satisfies the objects, aims, and advantages set forth above. While the invention has been described in conjunction with specific embodiments thereof, it is evident that many alternatives, modifications, and variations will be apparent to those skilled in the art in light of the foregoing description. Accordingly it is intended to embrace all such alternatives, modifications and variations as fall within the spirit and broad scope of the appended claims.

The invention claimed is:

1. A laser sintering powder composition comprising:
   a) greater than 35 to 80 wt. % of SEBS or S(EB/S)S or a mixture thereof,
   b) 20 to less than 65 wt. % of C3-C8 polyolefin, or a mixture of two or more polyolefins,
   c) 1 to 15 wt. % mineral oil,
   d) 0.2 to 1 wt. % antioxidant(s),
   e) 0 to 5 wt. % colorant, and
   f) 0.5 to 15 wt. % of surface modifying agent,
   wherein the total of all components (a to f) is 100 wt. % of said composition, and 0.1 to 5 wt. % powder flow agent wherein said powder flow agent is hydrophobic fumed silica or a metal oxide, based on 100 weight parts of said laser sintering powder composition, wherein the particle size of said composition is less than about 150 μm, and wherein the laser sintering powder composition has a melt flow rate of at least 20 grams/10 min. at 190° C/2.16 kg mass according to ASTM D1238;

wherein the polystyrene content of the SEBS ranges from 10 to 30 wt. % based on the total weight of the block copolymer; and wherein the laser sintering powder composition has a Shore A hardness ranging from 70 to 95 measured on injection molded plates.

2. The laser sintering powder composition of claim 1 wherein said SEBS or S(EB/S)SS-EB/S-S is radially coupled and takes the form (S-EB)nX or (S-EB/S)nX, wherein S is styrene, EB is ethylene butadiene (hydrogenated butadiene), n is between 1.5 and 6.0, and X is the residue of a coupling agent.

3. The laser sintering powder composition of claim 1 wherein said polyolefin or mixture of two or more polyolefins is polypropylene homopolymer or copolymer, respectively.

4. The laser sintering powder composition of claim 1 wherein said polyolefin or said mixture of two or more polyolefins has a melt point less than about 170° C.

5. The laser sintering powder composition of claim 1 wherein said powder flow agent is applied to said laser sintering powder composition in an amount of 0.1 to 3 parts by weight based on 100 weight parts of said laser sintering powder composition.

6. The laser sintering powder composition of claim 1 wherein said antioxidants include primary and secondary antioxidants.

7. The laser sintering powder composition of claim 6, further comprising a colorant.

8. The laser sintering powder composition of claim 1 comprising a mixture of SEBS and S(EB/S)S in a weight ratio ranging from 1/3 to 3/1.

9. A laser sintered article comprising the laser sintering powder composition of claim 1.

10. The laser sintered article of claim 9 wherein said polyolefin before sintering is polypropylene homopolymer or copolymer.

11. The laser sintered article of claim 9 further including a surface modifying agent present in an amount of 0.5 to 10 wt. %, based on weight of the article.

* * * * *